United States Patent [19]
Mulder et al.

[11] Patent Number: 6,125,913
[45] Date of Patent: *Oct. 3, 2000

[54] PROCESS FOR THE ALUMINOTHERMIC WELDING OF RAILS WITH ALLOYING OF THE WELD METAL IN THE RAIL HEAD REGION

[75] Inventors: Gerhardus Johannes Mulder; Michael Steinhorst, both of Essen, Germany

[73] Assignee: Elektro-Thermit GmbH, Germany

[ * ] Notice: This patent is subject to a terminal disclaimer.

[21] Appl. No.: 08/926,397

[22] Filed: Sep. 9, 1997

[30] Foreign Application Priority Data

Sep. 13, 1996 [DE] Germany ............................. 196 37 282

[51] Int. Cl.[7] ................................................... B23K 23/00
[52] U.S. Cl. ................................ 164/54; 164/58.1; 249/86
[58] Field of Search ........................... 164/54, 55.1, 56.1, 164/57.1, 58.1, 59.1; 249/86

[56] References Cited

U.S. PATENT DOCUMENTS

| | | | |
|---|---|---|---|
| 1,760,010 | 5/1930 | Schultz | ........................................ 249/86 |
| 3,189,959 | 6/1965 | Ahlert et al. | ............................... 164/54 |
| 3,514,285 | 5/1970 | Bakkerus | ................................ 164/57.1 |

FOREIGN PATENT DOCUMENTS

| | | | |
|---|---|---|---|
| 580035 | 7/1933 | Germany | ................................. 164/54 |
| 898 989 | 10/1953 | Germany . | |
| 2454184 | 5/1976 | Germany | .................................. 249/86 |
| 56-50763 | 5/1981 | Japan | ..................... 164/55.1 |
| 6908444 | 12/1970 | Netherlands | .......................... 164/55.1 |
| 658 817 A5 | 12/1986 | Switzerland . | |
| 1527054 | 10/1978 | United Kingdom | .................. 164/57.1 |

*Primary Examiner*—Harold Pyon
*Attorney, Agent, or Firm*—Scully, Scott, Murphy & Presser

[57] ABSTRACT

The invention relates to a process for the aluminothermic welding of rails, the aluminothermically produced steel being poured into a refractory mold surrounding the rail ends which are to be joined, and alloying additives being contacted with that part of the steel which runs out of the reaction crucible and forms the weld in the rail head region, wherein the alloying with the alloying additives is carried out after the completion of the aluminothermic reaction and separation of the steel from the slag during tapping and before the steel runs into the casting cavity formed by the mold, and the overflow in the casting mold is closed.

8 Claims, 9 Drawing Sheets

PROCESS FOR THE ALUMINOTHERMIC WELDING OF RAILS WITH ALLOYING OF THE WELD METAL IN THE RAIL HEAD REGION

BACKGROUND OF THE INVENTION

The invention relates to a process for the aluminothermic intercast welding of rails with controlled alloying of the cast steel in the rail head region. The object of the process is purposefully to set a desired property pattern in the weld in accordance with the requirements of the track.

DESCRIPTION OF THE PRIOR ART

The aluminothermic welding process (THERMIT process) is the only one of the known fusion-welding processes which exploits a chemical reaction for generating the hot molten filler material.

In this case, the high affinity of aluminum for oxygen is utilized for the reduction of heavy metal oxides, preferably iron oxide.

The process which operates highly exothermically can be described as or for the iron reaction After punctiform ignition using a small pilot rod, the aluminothermic reaction proceeds in a crucible within a few seconds, with vigorous evolution of heat. The hot reaction products at approximately 2500° C. then separate from one another, the lower-density slag ($Al_2O_3$) floating on the iron.

Granulated steel particles for damping the reaction and, depending on the base material to be welded, steel formers such as C, Mn, Cr, V, Mo are mixed into the base constituents of the THERMIT fraction—iron oxide and aluminum of small grain size.

The hot molten THERMIT steel of defined quality, smelted in the reaction mixture, is outstandingly suitable for welding process purposes. The welding process can be characterized by the following working steps:

- aligning the workpeices laid with a gap depending on the welding cross section and the process;
- forming a refractory mold around the welding point;
- preheating the ends of the workpieces by means of a special burner with gas/air, gasolene/air, gasolene/oxygen, acetylene/oxygen or preferably propane/oxygen mixtures;
- pouring of the hot molten steel into the mold and welding of the workpiece ends by intercasting and casting-in.

Using this process, workpieces of any type with any desired cross sections can be welded together during construction or repair. Because its procedure is simple and independent of external energy sources, the THERMIT welding process has found its most widespread application in rail welding. The alumninothermically generated steel, serving here as the welding material, should correspond in its strength properties as far as possible to the rail steel.

This demand is met by the known aluminothermic mixtures—also called welding portion—by adding alloying elements such as, in particular, carbon, manganese, chromium, silicon, vanadium and titanium to the base mixture consisting of aluminum and iron oxides. For damping and cooling, iron or scrap steel are also mixed into the aluminothermic mixture, whereby the steel yield is increased at the same time.

Thus, very specifically alloyed rail grades are sometimes used in various countries, where there is an interest in concentrating these specific alloying elements under control in the rail head composition, without the rail foot being alloyed.

In recent years, however, head-hardened rails have increasingly been used in rail traffic. The reason for this trend is that, on the one hand, the stresses on the rails increase which leads to intensified wear in conventional rails and, on the other hand, there are increasingly economic imperatives, so that longer replacement cycles of rails are desired.

For example, particularly tight radii (<300 m), extreme gradients or the increasingly rising axle loads, in particular in countries with predominantly heavy-load traffic, such as in North America, South Africa, Asia and Australia, represent an increasing stress on the rail, which must be taken into account both for the rail and for the joining of rails.

The increased use of hard-hardened rails of course also makes it necessary to adapt the required joining technologies.

It would here be of particular interest for the track operation, to achieve an increase in hardness in the head region and, in relation thereto, increased ductility in the foot of the rail.

In addition, grain-refining alloying additives are also frequently used where controlled concentration in the head would be desirable.

Hitherto, the thermit welding portions have thus been modified in newly developed rail grades, so that the entire rail joint was adapted to the changed rail grade but itself showed a uniform property pattern.

This means that, in conventional aluminothermic welding technology, hardening additives are mixed into the welding portion in order to effect the required hardness in the head region, but that simultaneously the same hardness is obtained in the entire rail profile, that is to say also in the rail foot region, where ductility is rather more desired.

CH-PS 658,817 describes a process for the aluminothermic composite welding, in which two cast steel alloys are made up of from two welding materials of different composition in such a way that they give in each case, from two crucible chambers one hard and wear-resistant steel for the rail head and a tough ductile steel, flowing first into the mold, for the welding of the web and rail foot.

This means that this process is a two-stage process. This procedure is very time-consuming and, for use in practice on the track, so complicated that it has not been able to gain acceptance in the face of the conventional thermit joint-welding known worldwide. In addition, further interfaces are formed between the two thermit steels, it being possible for undesired defects to arise in the weld.

From the Patent Specification DE-PS 898,989 it is known that the iron formed in the aluminothermic reaction can be alloyed with steel-refining metals or metalloids which are located in an excavation in the upper part or on the bottom of the mold surrounding the material to be welded.

It is the object of this invention to provide a thermit steel which is as homogeneous as possible and to avoid possible losses of required alloying additives via the slag as far as possible. However, it is pointed out that ultimately and thoroughly mixed steel is desired.

Moreover, it is expensive in production technology and in addition difficult in the case of alloying the rail head to incorporate these metals or metalloids in the mold, since between the mold and the running surface, which is to be alloyed, of the rail head is large. The metal/metalloid must overcome this distance solely by diffusion.

There was thus a need for the simplest possible welding process which comprises only one process step or reaction step, to provide the metals or metalloids to be alloyed in a simple but also reliable manner, that is to say both in the preparation of the required consumable materials and in the installation of the thermit weld, and also makes it possible to concentrate these alloying additives under control in the head of the weld. It is the object of the welding process to be developed to produce a joint which is in accordance with the property pattern of the rails to be welded and in particular achieves a hard weld material, which is as fine-grained as possible, in the rail head, and at the same time ensures a foot which is less prone to breakage and is as ductile as possible.

By means of such a welded joint, the wear resistance and the associated economic advantages would be realized and the quality of the weld would be improved because of the higher hardness and a microstructure of higher load-bearing capacity due to the finer grain.

Depending on the alloying element or combination of alloying elements and on the quantity to be alloyed in, a different property pattern—chemical composition of the steel, mechanical properties, microstructures and the like—can be set. These different properties depend in part on one another, according to the nature and quantity of the additive.

There was a particular need for the simplest possible, most reliable and reproducible methods in the aluminothermically produced steel to be contacted under control with thermit steel additives to be alloyed in with that part of the steel which runs out of the reaction crucible and forms the weld in the rail head region.

Furthermore, intimate thorough mixing of the thermit steel within the casting mold must be avoided at all costs. Otherwise, a concentration of alloying additives in the head cannot be achieved.

BRIEF SUMMARY OF THE INVENTION

The subject of this present invention is a process wherein the alloying with the alloying additives is carried out after the completion of the aluminothermic reaction and separation of the steel from the slag during the pouring off and before the feed runs into the casting cavity by the mold, and the overflow in the mold is closed.

DETAILED DESCRIPTION OF THE DRAWINGS

Figures 1A, 1B:
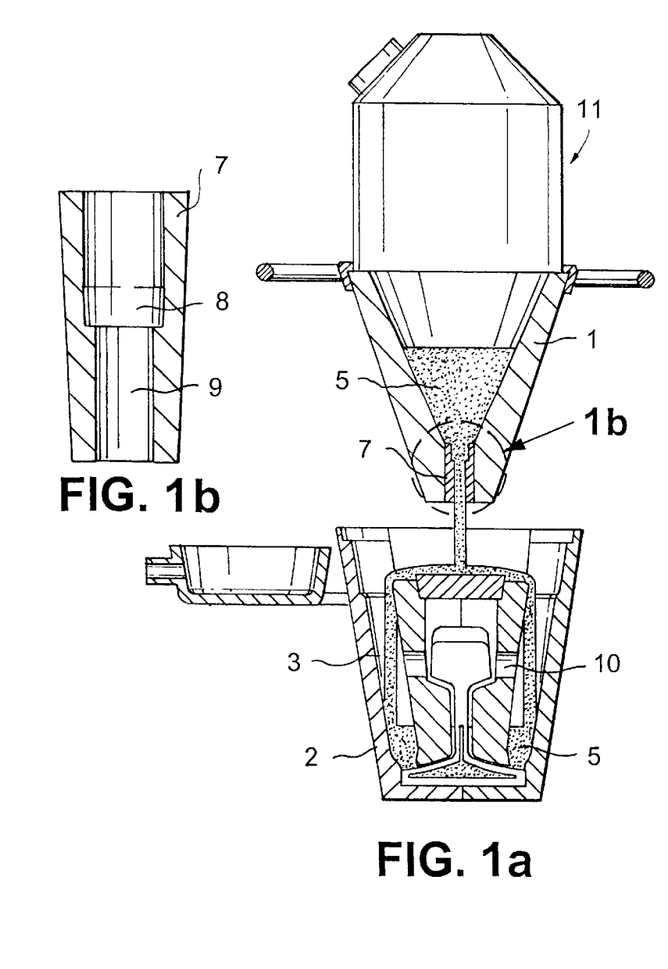
FIGS. 1a–1c and 2a–2c are cross-sectional views of apparatus useful in the practice of the invention.
Figure 1C:
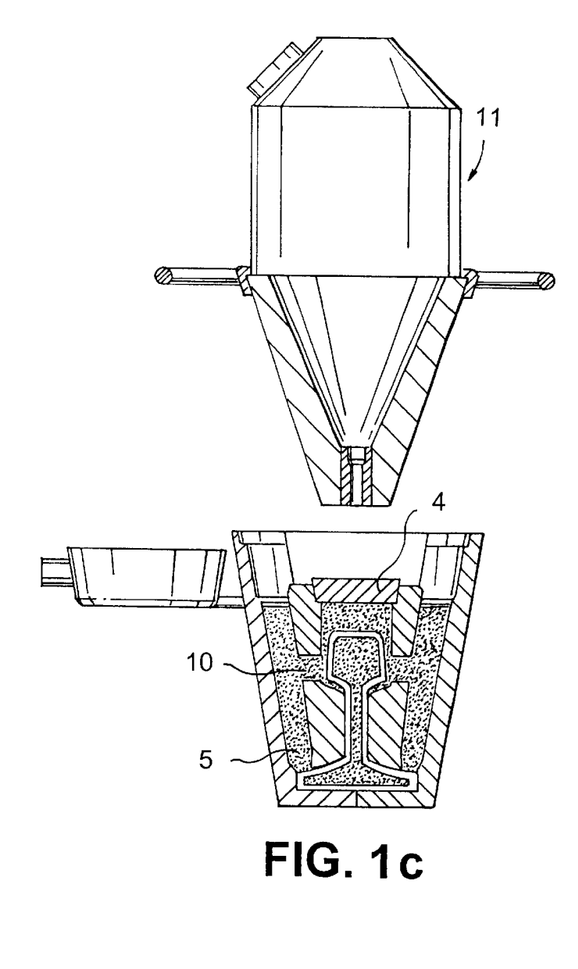

Referring now to FIGS. 1a–1c, the overflow, which is to be closed, in the mold is marked (10) in FIG. 1c.

Figures 2A, 2B:
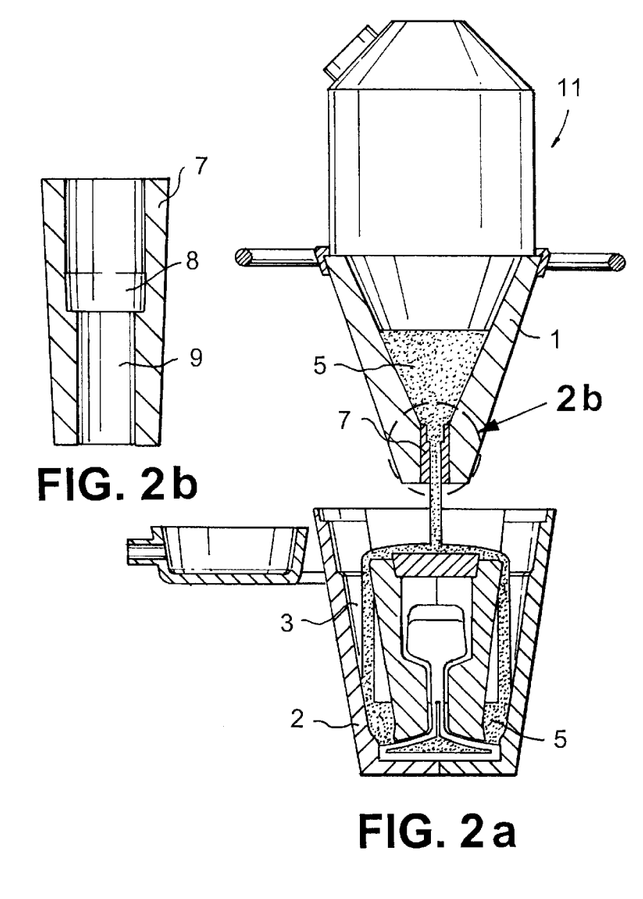
Figure 2C:
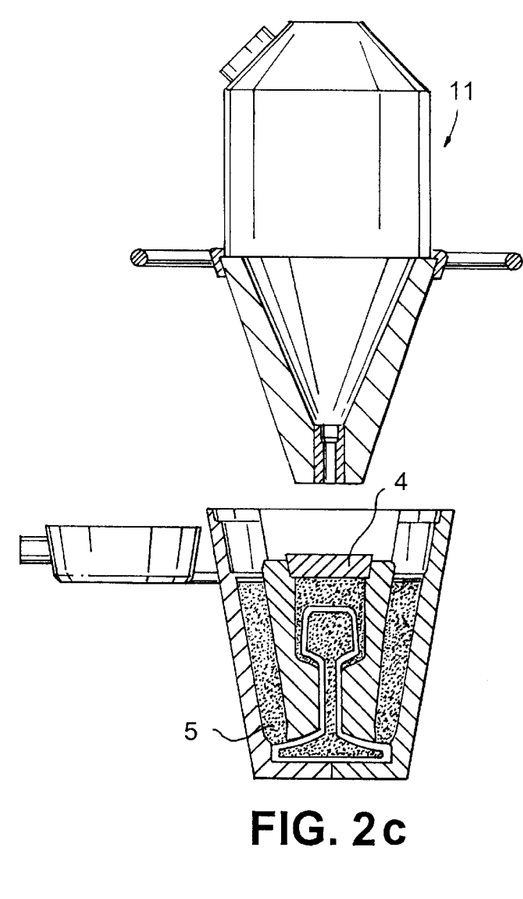

In the casting process according to uphill-pouring—FIGS. 2a–2c —the aluminothermically produced steel is caused to run not into the rail region of the mold but through the riser (3) into the mold (2). In th is case, the steel running in rises in the rail region of the mold, the over flow being closed.

It is possible to leave the overflow open. However, the overflow must then be arranged in such a way that the thermit steel flowing out first cannot prematurely come into contact with the steel running out last, that is to say before it reaches the head or at the head. This is achieved by positioning the overflow above the rail head.

Thus, the steel running first into the mold then forms the rail head so that, in the uphill-pouring process, the steel running in first must be alloyed appropriately. Since the reaction mixture located in the lowest region of the crucible 11 forms the steel running first into the mold, it is possible to introduce the alloying constituents into the steel during the tapping of the reaction crucible 11 and before running into the casting cavity formed by the mold (2).

A procedure which is particularly expedient for handling is possible in an uphill-pouring process by integrating the alloying constituents (9) in a thimble (1), closing the crucible outlet (7), with an integrated releasing system (8), the so-called automatic thimble (1). These automatic thimbles (1) are normally used in aluminothermic welding for ensuring that the molten steel (5) automatically runs out at a defined temperature and thus at a defined point in time. The alloying elements can be introduced in a similar manner into a cavity, provided for this purpose, in this thimble (1).

Another method of introducing the alloying components (9) into the thermit steel (5) running out can be effected via the crucible plug body. In this case, the alloying additives are mixed into the foundry sand mix during the production of the thimble body.

As the alloying additives which are picked up by the Thermit steel at a later stage, on the one hand hardening and/or grain-refining metals or alloys are to be preferred. These include the ferro-alloys of the elements V, Ti, Nb, Cr, Mn, Si and the like, the rare earths or the oxides and carbides thereof as well as carbon in bound or elemental form.

Depending on the nature and quantity of the alloying additives made available, it is thus possible by means of the process according to the invention to achieve desired concentration of the separately added elements in the weld and adapt these in a controlled manner to the rail loading.

The components alloyed in a later stage can be employed in the elemental or metallic form or as a metalothermic reaction mixture.

This procedure is thus independent of the chemical state of the component to be alloyed in.

The alloying elements added to the Thermit steel at a later stage are preferably employed in the form of powders or granules.

Usually, the starting or standard mixture employed in the process according to the invention is an aluminothermic mixture consisting of essentially aluminum, iron oxide and damping agent, with which carbon contents from 0.1 to 1.0% by weight and manganese contents from 0.2 to 2.0% by weight in the weld are obtained.

The alloying constituents carbon and manganese do not necessarily have to be provided via the aluminothermic mixture. This is also possible by means of the alloying method according to the invention, which allows the later alloying with any desired alloying constituents in the uphill-pouring process. In this case, only iron is produced aluminothermically.

With a suitable choice of the alloying method, the alloying elements and their concentration, the weld can thus be adapted as closely as possible under control to the property pattern of the rail such as, for example, chemical composition or hardness. For example, a hardness gradient in the weld with a comparatively hard rail head and a soft rail foot can be produced in a very simple manner.

Like the hardness, the deflection (static bent test) and the resistance against crack generation and propagation depend on the material, so that an improvement in these characteristics data is obtained in the case of a more ductile rail foot.

The deflection, more precisely the deflection at the moment of fracture, is determined in a static bend test. In addition to the deflection, the fracture load is established, that is to say the maximum force to be applied for breaking of the welded rail, and, with unchanged geometry, this is also a measure of the bending strength. In contrast to the deflection, the breaking load depends only on the geometry of the rail, so that it is not possible to influence this mechanical characteristic by alloying technology.

A special characteristic for the operational reliability of a track is the crack-resisting force, that is to say the force which a material can exert against crack formation and propagation. It is known that the crack-resisting force increases with increasing toughness of the material. The process according to the invention therefore provides an improved crack-resisting force owing to the more ductile foot.

When alloying the steel which forms the rail head and which has a temperature of about 2100° C. when it runs into the mold, a controlled concentration of suitable alloying elements, to be picked up by the liquid Thermit steel at a later stage, in the rail head region of the welded joint can be influenced in a controlled manner. This includes the hardness, deflection, crack-resisting force and wear resistance.

Figure 3:
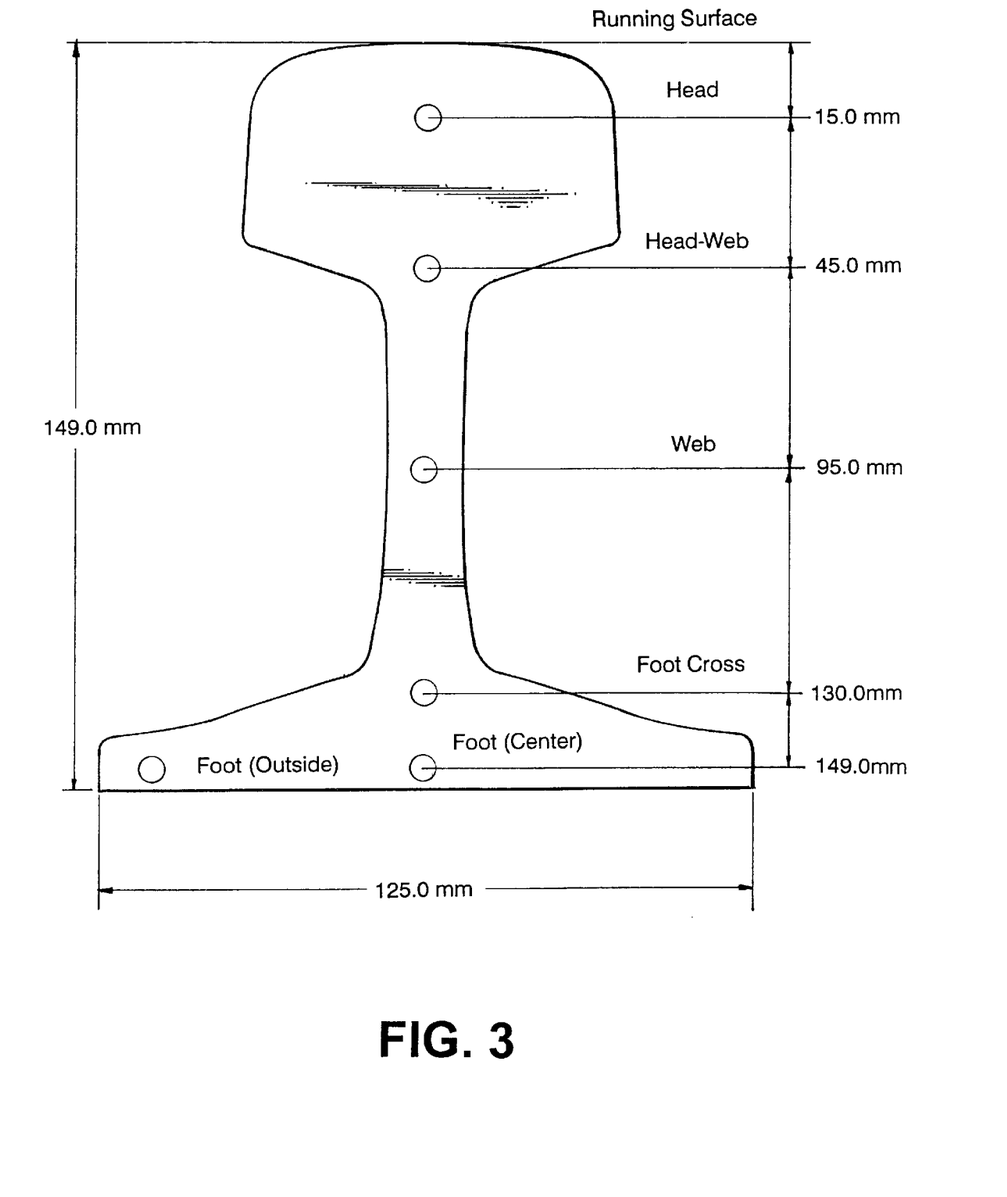
FIG. 3 is cross-sectional view of a rail, marked to show analyis points and hardness points.

The hardness gradients achievable according to the invention in the rail profile are explained in more detail in what follows:

First, FIG. 3 shows the measured analysis points and hardness points at a distance from the running surface (in mm), taking the rail profile S 49 having a weight per meter of 49 kg/m as an example.

Figure 4:
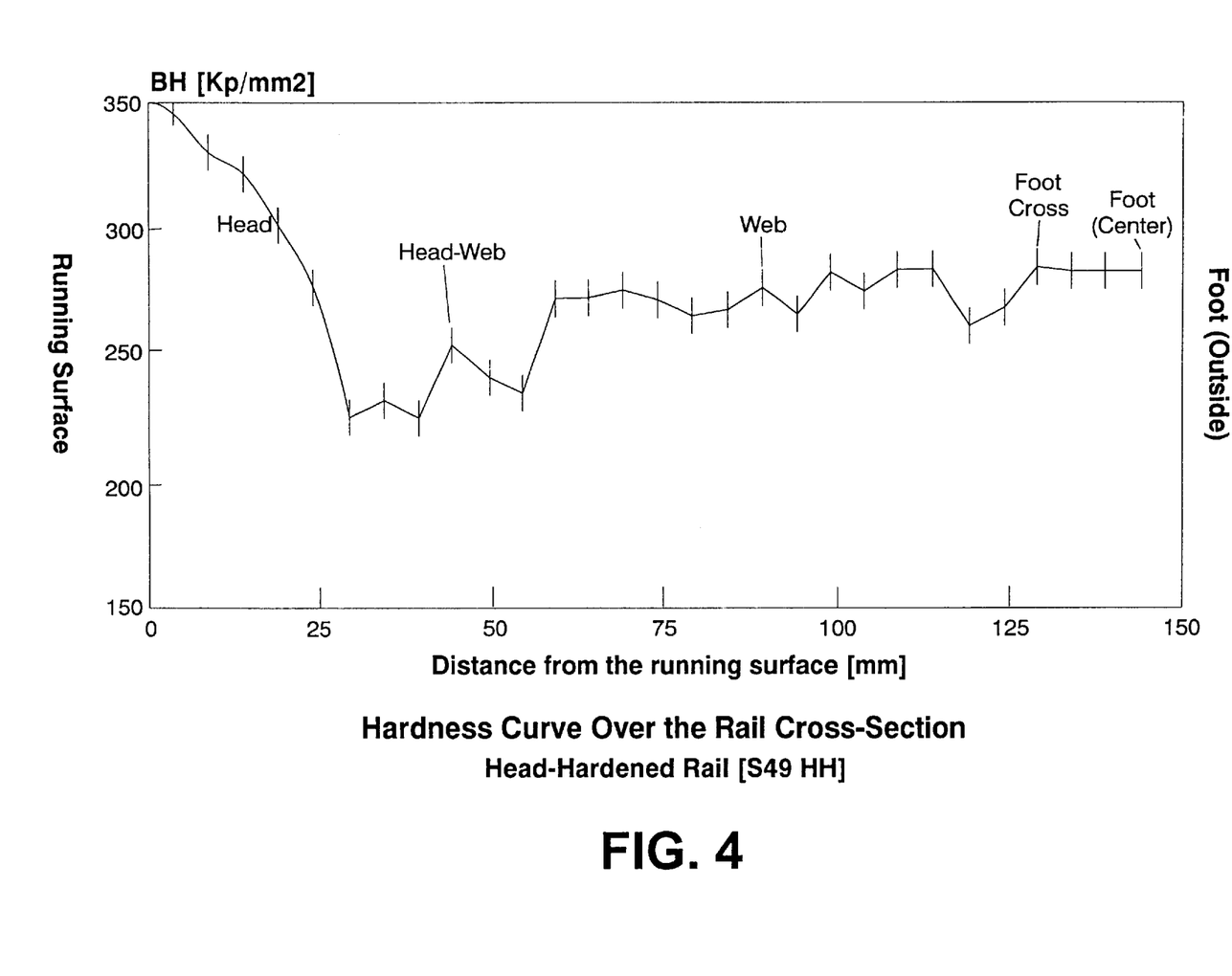
FIGS. 4, 5, 6, and 7 and 8 are graphs of rail hardness.

FIG. 4 represents the hardness curve of a head-hardened rail (S 49 HH), expressed in BH (Brinell hardness) in $kp/mm^2$ at the respective distance from the running surface, as shown in FIG. 3. It can clearly be seen that the hardness is increased in the rail head region as compared with the rest of the profile.

Figure 5:
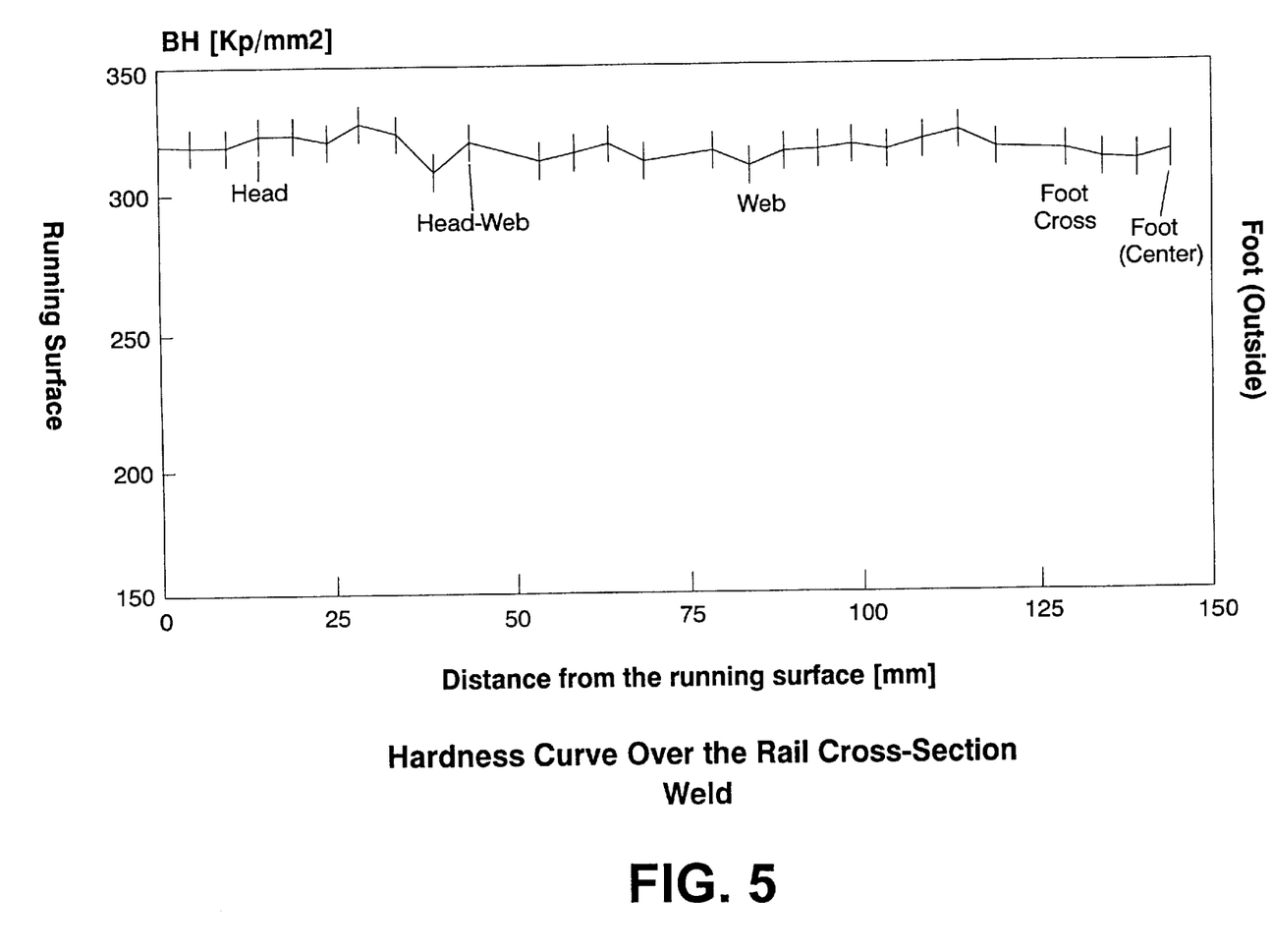

FIG. 5 shows the hardness curve of a currently conventional aluminothermic weld in head-hardened rails. In this case, essentially hardness values are obtained which correspond to the hardness in the rail head; this hardness is, however, uniformly present in the entire rail profile of the weld, with the disadvantages described above.

Figure 6:
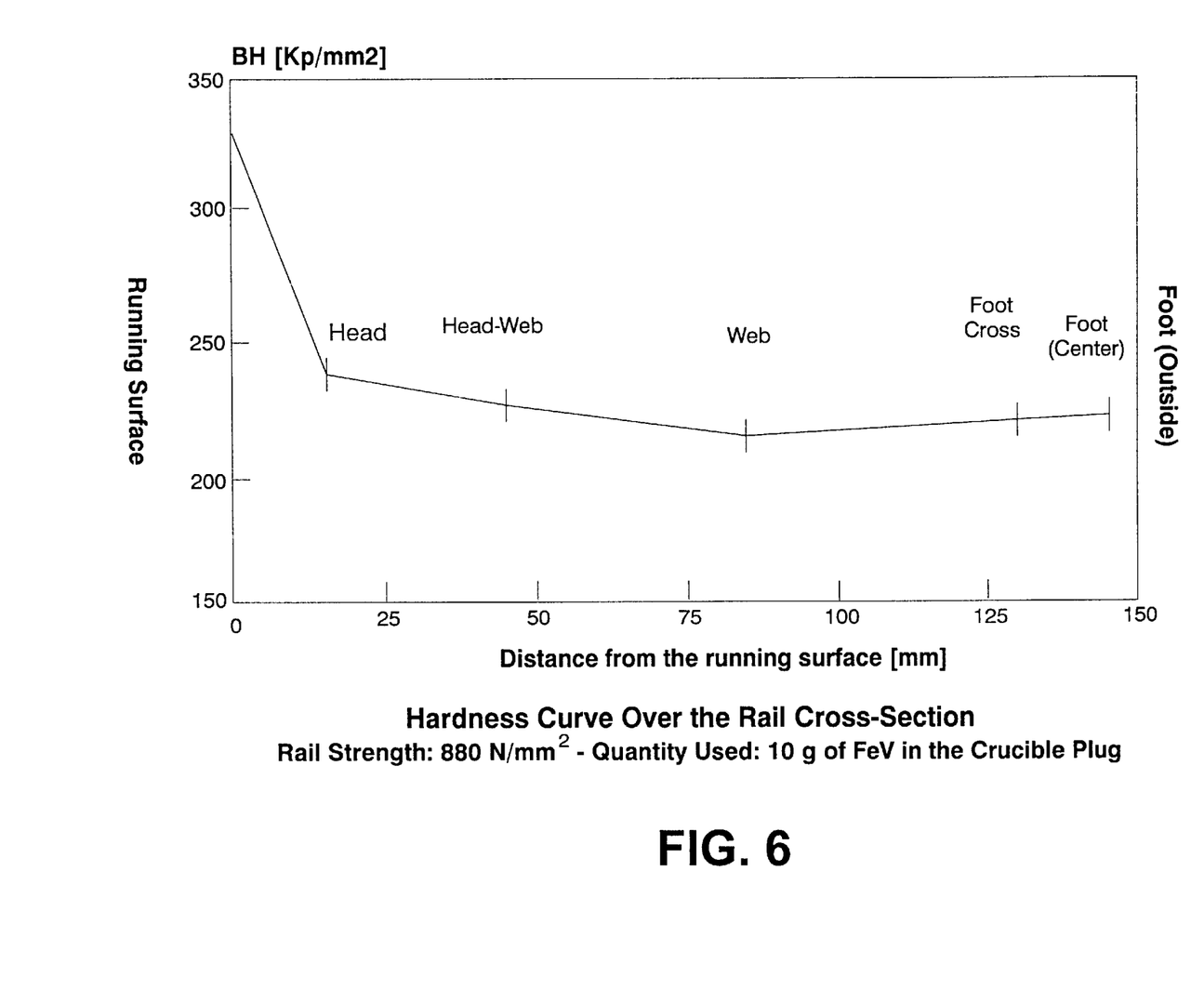

An example of the alloying method according to the invention with uphill-pouring can be seen from FIG. 6. In this case, 10 g of FeV were integrated into the crucible plug.

With the hardness of more than 300 kp /$mm^2$ obtained on the running surface, deflection values of 33 mm are achieved during the conventional static bend test.

Figure 6A:
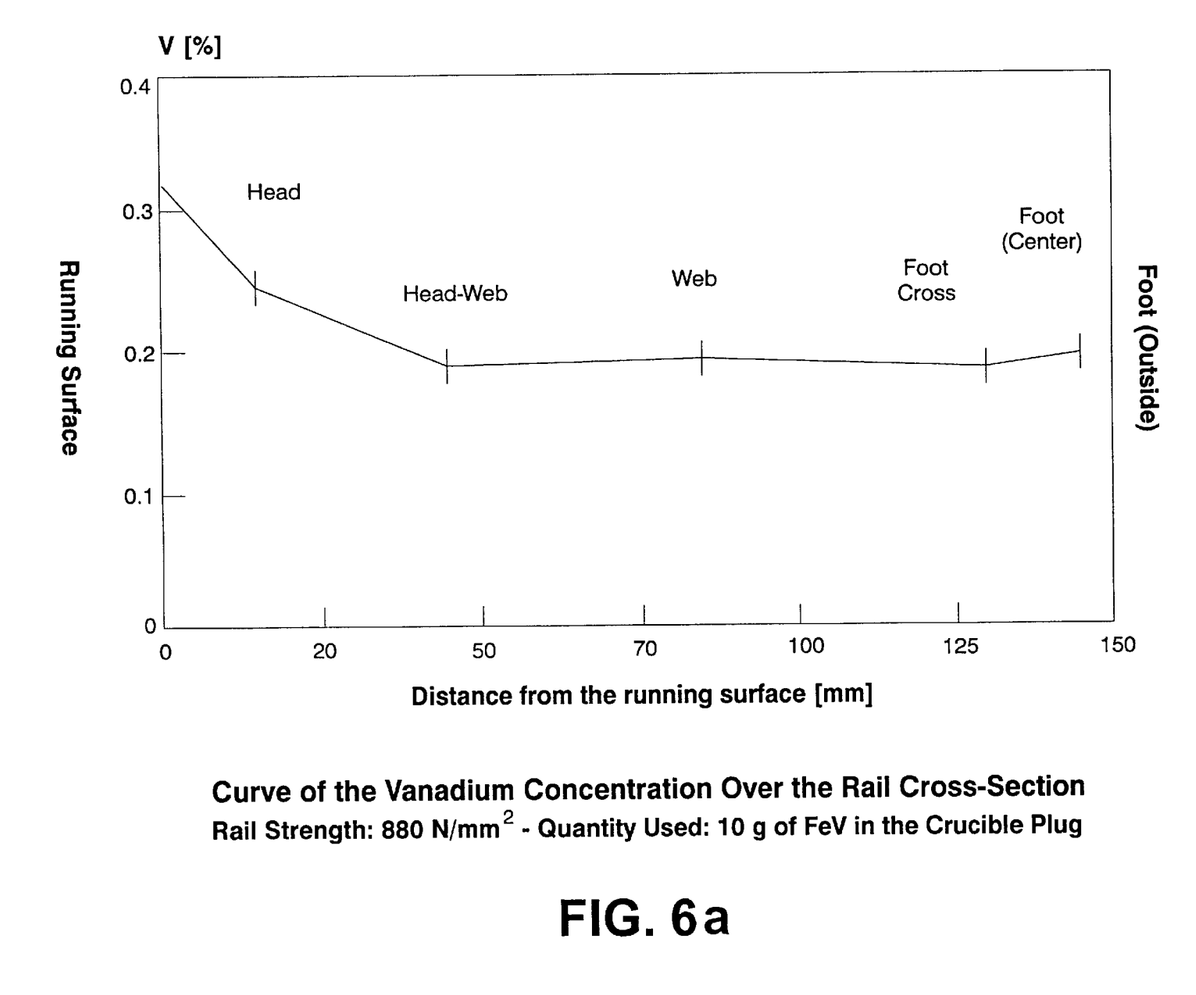
FIG. 6a is a chart of vanadium concentration.

FIG. 6A shows the corresponding vanadium concentration.

Figure 7:
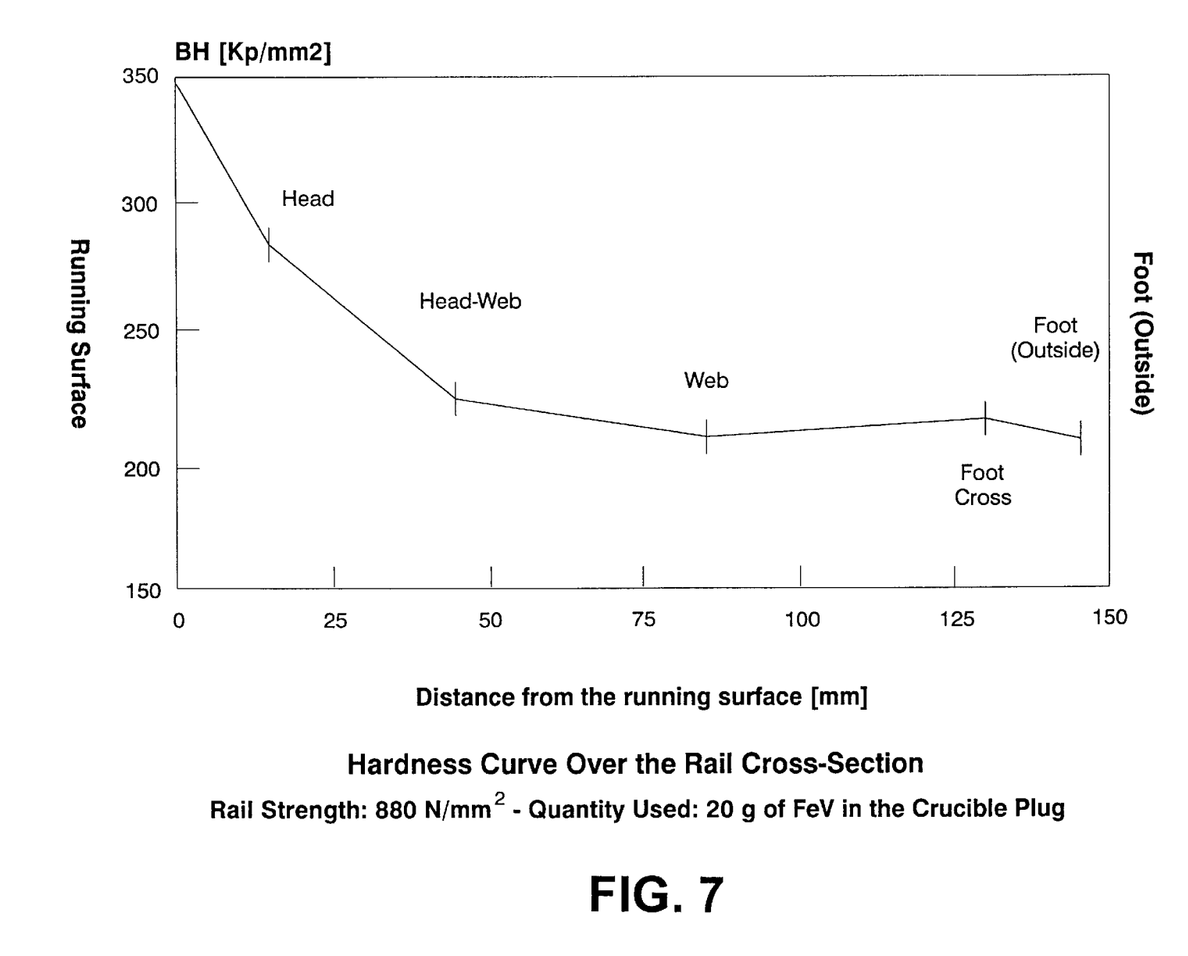
Figure 8:
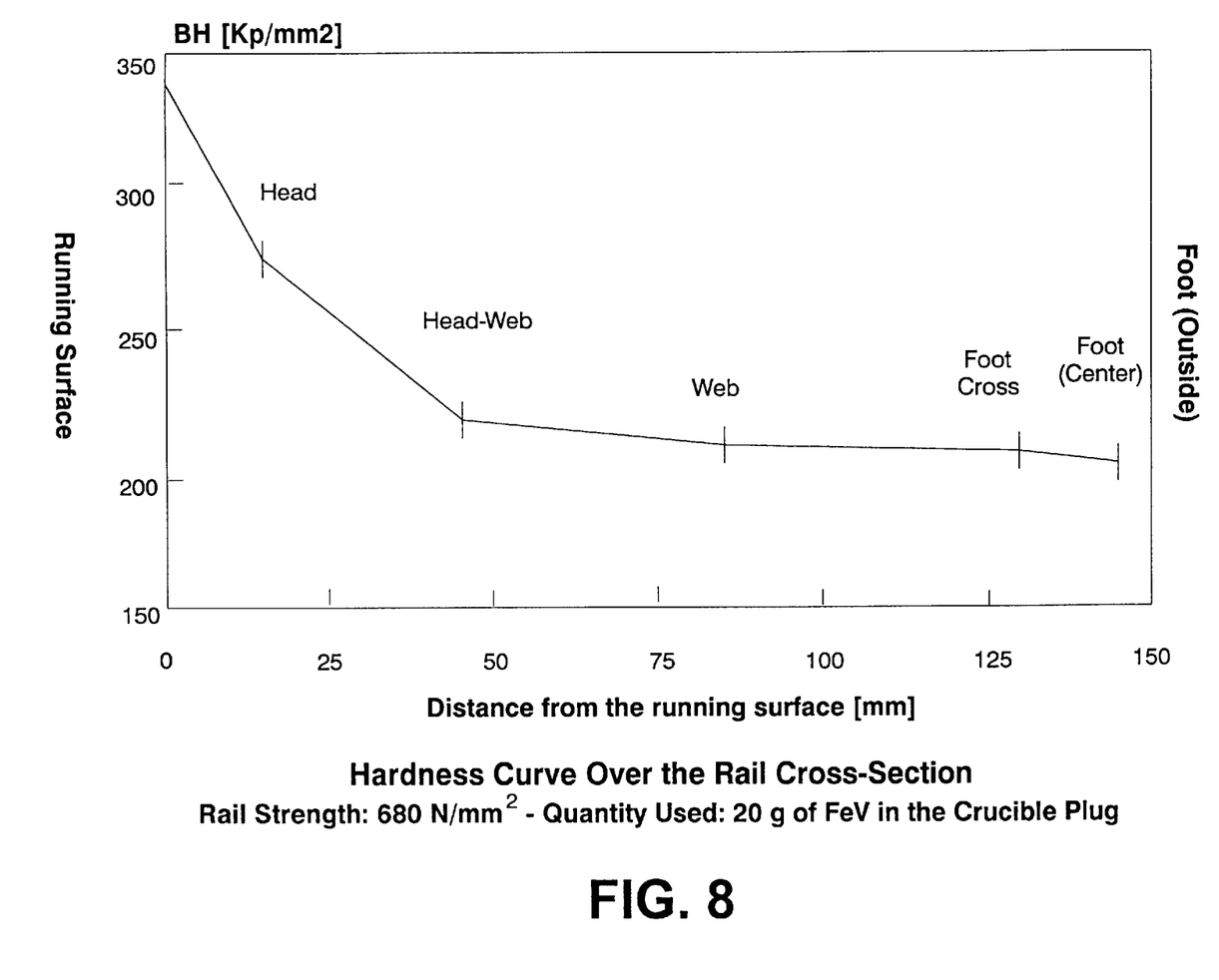

FIGS. 7 and 8 show the corresponding values at 20 g of alloying additive for different rail strengths.

What is claimed is:

1. A process for the aluminothermic welding of rail ends, comprising alumniothermically producing steel in a reaction crucible, pouring molten steel from the reaction crucible into a refractory mold which has an overflow and which surrounds the rail ends which are to be joined, and contacting alloying additives with that part of the steel which has run out of the reaction crucible to form the weld in the rail head region, which comprises alloying with the alloying additives after the completion of the aluminothermic reaction and separation of the steel from the slag while the steel runs into the casting cavity formed by the casting mold with the overflow in the mold being closed wherein the alloying with the alloying additives is carried out via an automatic thimble before the steel runs into said casting cavity and with said pouring of molten steel into said mold being designed as an uphill-pouring process.

2. The process as claimed in claim 1, wherein the alloying additives are employed in the form of a powder or granules.

3. The process as claimed in claim 1, wherein the alloying additives are employed in a solid compact form.

4. The process as claimed in claim 1, wherein the alloying additives are mixed into the foundry sand mix during the making of the automatic thimble body.

5. The process as claimed in claim 4, wherein the alloying additives are employed in the form of a powder or granules.

6. The process as claimed in claim 1, wherein the alloying additives are accommodated in a cavity beneath the automatic thimble.

7. The process as claimed in claim 6, wherein the alloying additives are employed in the form of a powder or granules.

8. The process as claimed in claim 6, wherein the alloying additives are employed in a solid compact form.

* * * * *